United States Patent [19]
Hotto

[11] Patent Number: 5,646,940
[45] Date of Patent: Jul. 8, 1997

[54] SYSTEM FOR SIMULTANEOUS ANALOG AND DIGITAL COMMUNICATIONS OVER AN ANALOG CHANNEL

[75] Inventor: Robert Hotto, La Jolla, Calif.

[73] Assignee: Novi International, Inc., Santee, Calif.

[21] Appl. No.: 578,382

[22] Filed: Dec. 26, 1995

Related U.S. Application Data

[63] Continuation of Ser. No. 427,003, Apr. 24, 1995, abandoned, which is a continuation-in-part of Ser. No. 881,747, May 4, 1992, Pat. No. 5,410,541.

[51] Int. Cl.$^6$ ............................................. H04J 1/14
[52] U.S. Cl. ........................ 370/496; 370/528; 375/216; 379/33.26
[58] Field of Search ........................ 370/69.1, 76, 124, 370/110.1, 110.4, 111; 375/216, 217, 279; 379/97; 395/2.1, 2.14, 2.19; 455/68, 70

[56] References Cited

U.S. PATENT DOCUMENTS 3,586,781  6/1971  Jones ............................................. 370/111
4,903,292  2/1990  Dillon ............................................. 370/76

Primary Examiner—Benedict V. Safourek
Attorney, Agent, or Firm—Thomas J. Tighe

[57] ABSTRACT

At a transmitting end, frequencies used to a construct a digital signal are substantially removed from an analog signal by a notch filter circuit to produce an interim signal which is then combined with the digital signal as by combining to produce a composite analog signal that is transmitted to a receiving end. At the receiving end the frequencies used to construct the digital signal are substantially removed from the composite analog signal by a notch filter circuit. In this way the digital signal can be transmitted simultaneously with the analog signal without errors that could be introduced by the analog signal, and with only a slight change to the frequency spectrum of the analog signal. In a second embodiment, the system provides clear and error free continuous transmission of digital signals over an analog channel simultaneously with an analog signal by periodically analyzing the analog signal and, during any given period, transmitting the digital signals in open bands, i.e. bands that are not used, or are slightly used, by the analog signal in the given period.

20 Claims, 4 Drawing Sheets

SYSTEM FOR SIMULTANEOUS ANALOG AND DIGITAL COMMUNICATIONS OVER AN ANALOG CHANNEL

This is a continuation of application Ser. No. 08/427,003 filed Apr. 24, 1995, now abandonded which is a continuation-in-part of U.S. application Ser. No. 07/881,747, filed May 4, 1992, now U.S. Pat. No. 5,410,541, the entire contents of which are incorporated herein by reference.

BACKGROUND OF THE INVENTION

This invention relates in general to devices for providing simultaneous transmission of analog communication and digital data over an analog channel, and in particular to such devices that remove from the channel's bandwidth available only those frequencies necessary to accomplish the data transmissions and only during the data transmissions, or in the alternative such devices that continuously adapt to send data in one or more bands not used, or slightly used, by the analog signal.

A need exists for a way to transfer, from time to time, bursts of digital data over an analog channel simultaneously with analog communications without degrading the fidelity of the analog communications except only slightly during the bursts of digital data. Such a need exists in the art of telephone communications, particularly with the introduction of a feature commonly called "caller identity delivery" also known as "caller i.d." (hereinafter sometimes referred to as "CID"). This feature provides a user with certain identifying information of a caller, such as telephone number and/or the name of the caller. This identifying information, i.e. data, is transmitted digitally from a telephone company to its users' telephone equipment via the same voice frequency channels used for voice communication for display on their respective equipment. In the case where the user is not using the telephone when a caller rings, the CID information is transferred between the first and second ring signals. The user can then view the information to decide whether to answer the telephone.

The techniques for transmitting digital data over an analog channel such as a voice frequency channel are well known in the art. For example transmission of the digital data can be, and is most commonly, accomplished using a technique called "FSK" or frequency shift keying. For another example, digital data can also be transmitted over such channels by a technique called "PSK" or phase shift keying. Both of these techniques utilize a portion of the frequency spectrum available on the channel.

A conflict can arise when a user has the CID feature and also has a telephone feature commonly called "call waiting." (The combination of the two features is commonly called "caller i.d. on call waiting" hereinafter sometimes referred to as "CID/CW"). If a user's equipment is connected to another party, the call waiting feature alerts the user to the presence of a waiting call by a distinctive audible indication. The user can then elect to receive the waiting call by a known keying operation. The conflict arises whenever the user is telephoned by a caller while the user is engaged in a telephone conversation with another party and the caller's CID information is transmitted to the user's receiver. The CID transmission takes place almost automatically after the user is alerted to the new call so that this information can be used to help decide whether to take the new call. Since both the analog signals of the conversation between the user and the other party, and the digital signals corresponding to the caller's CID information are transmitted over the same analog channel, there can be audible interference between the two while the CID information is being transmitted. The user and the other party involved in the conversation can be subjected to annoying and uncomfortable bursts of sound generated by the CID data transmission.

A heretofore system that has addressed this CID/CW problem uses a technique of muting all sound to the conversing parties while the caller i.d. information is being transmitted. This system has the advantage of providing an error free channel for the CID data communication, but it has a significant disadvantage in that it causes the conversation to be muted for the three to four seconds it takes to transmit the CID information.

Another heretofore proposed system for CID/CW involves using a spread spectrum signal for CID data transfer mixed with the voice signal. This system is too expensive and too complicated to implement. Moreover, the spread spectrum signal will be heard as noise to the user reducing the clarity of the voice communication during CID transfer.

A first embodiment of this invention avoids the muting without creating noise and is able to transmit CID information over a channel with no interruption in voice communication and without subjecting the conversing parties to the aforesaid annoying and uncomfortable burst of sound. It has the further advantage of not reducing the band of frequencies available on the channel for voice communications except only slightly during the brief CID data transmissions. It also provides an error free path for the data communications.

A second embodiment invention provides means for continually transmitting data and voice simultaneously over an analog channel at the highest possible data rates with the good audio quality. Conventional systems accomplish this task by means of digitizing and digitally compressing both the voice and data, sending it in one data stream and decompressing the data at the receiving end. The drawbacks to this is that no matter how well the compression algorithm works, analog representation is more compressed and provides more information than any digitally compressed data. Also, this method is more cost-effective since it does not require high-speed compression and re-expansion circuits.

The second embodiment operates by means of detecting the voice signal and determining how much of the voiceband width can be selectively or adaptively notched, i.e. eliminated, to provide a varying degree of data transmission rates. This differs from the first embodiment in that an array of notch filters are continually adjusted to provide maximum bandwidth for data and not degrade the voice quality significantly.

Other advantages and attributes are either discussed in, or can be gleaned from a reading of, the text hereinafter.

Previous methods of achieving simultaneous transmission of speech and data have been disclosed in U.S. Pat. Nos. 4,523,311, 4,512,013 and 4,280,020. These inventions multiplex the data and the analog signal thereby continuously degrading the quality of the analog signal.

SUMMARY OF THE INVENTION

An object of this invention is to maintain the maximum possible fidelity of an analog signal traversing an analog channel while providing error free data communications during without muting the analog signal.

A further object of this invention is to provide a system for transmitting a digital signal simultaneously with an analog signal without errors that could be introduced by the analog signal, and with only a slight change to the frequency spectrum of the analog signal.

A further object of this invention is to provide a system for clear and error free intermittent data communications by switching into the system notch filters, i.e. band elimination filters, that attenuate the data transfer frequencies, and after the data communications are complete, the notch filters are switched out of the system thereby providing maximum analog fidelity of the voice signal.

A further object of this invention is to provide a system for clear and error free continuous transmission of digital signals over an analog channel simultaneously with an analog signal by periodically analyzing the analog signal and, during any given period, transmitting the digital signals in open bands, i.e. bands that are not used, or are slightly used, by the analog signal in the given period.

These and other objects are achieved by a system for simultaneously transmitting analog and digital signals via an analog channel comprising a transmitting end comprising means for removing from the analog signal those frequency components used to construct the digital signal resulting in a first interim signal, the removal of said frequency components being for the purpose of preventing errors which could be caused by the presence of said frequency components in the analog signal, means for producing a second interim signal comprising at least a combining of the first interim signal and the digital signal, and means for transmitting the second interim signal; and a receiving end comprising means for receiving the second interim signal, and means for removing from the second interim signal those frequency components used to construct the digital signal. In a second embodiment a voice signal being transmitted is periodically analyzed, as by a fast fourier transform algorithm, for "holes" in the voiceband, and during each period the holes found are used to transmit data for that period. In any given period, data is transmitted via data subchannels disposed within the holes existing in that period. There is a fixed and known number of data subchannels spaced in frequency across the voiceband. The number and width of the holes in the voiceband in any given period is dependent on the amount of voiceband occupied by the voice signal during the period. A data subchannel is always open at the high end of the voiceband for periodically sending bursts of information (band select data) for synchronizing a receiver with a transmitter as to open holes and their widths. By defining holes the information also defines active data subchannels because they are fixed as to frequency and encoding techniques.

DESCRIPTION OF THE PREFERRED EMBODIMENT

Figure 1:
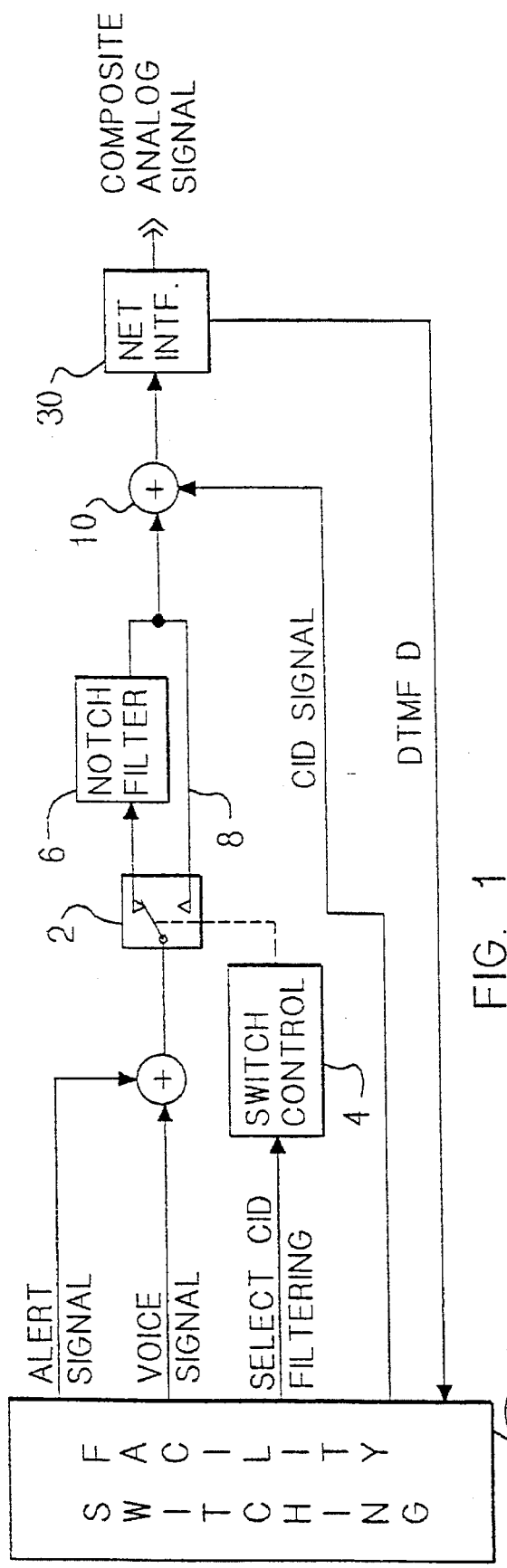
FIG. 1 is a functional block diagram of a first embodiment illustrating a portion an embodiment of this invention directed to a CID/CW application, a portion that resides in a telephone company central switching facility.

Referring to FIG. 1, the portion of a CID/CW system according to this invention that resides in a telephone company's central switching facility 1 is illustrated to have a switching means comprising a switch 2 and a switch control circuit 4. The switch is illustrated diagrammatically and is preferably a conventional semiconductor analog signal switch integrated with the switch control circuit. The switch provides two alternative paths for an incoming analog voice signal ("VOICE SIGNAL") originating from a telephone instrument (not shown) remote from the switching facility: a first path through a notch filter circuit 6, preferably a pair of serially connected notch filters, and a second path 8 that bypasses the notch filter circuit. Depending on the setting of the switch the incoming voice signal, either filtered or unprocessed, is communicated to one input of a signal adder 10, the output of which is amplified if necessary and transmitted via telephone lines to a second telephone instrument (partially illustrated in FIG. 2) also remote from the switching facility.

Referring again to FIG. 1, the switch control 4 is caused to select the notch filter path for the incoming voice signal at times when CID data is being transmitted to the second telephone instrument by the switching facility 1. The CID data is transmitted by combining a corresponding CID signal ("CID SIGNAL") with the processed incoming voice signal by means of adder 10. The notch filter circuit 6 substantially removes the notch frequency or frequencies from the frequency spectrum available on the channel for voice communication. The frequencies removed are those that are used by the switching facility to construct the CID data signals. For example, if the switching facility uses an FSK method of sending the CID data, then the notch filter circuit effectively removes from the spectrum available for voice communications those frequencies, plus and minus a tolerance, that are used for the FSK "mark" and "space" signals. In a PSK method, a single notch filter substantially makes the carrier frequency unavailable for voice communications. This is done in order to avoid errors in the transmission of the CID signal components of the composite analog signal ("COMPOSITE ANALOG SIGNAL") sent to the second telephone instrument. Errors could occur if the voice signal contained relatively strong components of the CID transmission frequencies.

Referring again to FIG. 1, for illustrative purposes only the switch control 4 selects the notch filter path in response to a signal ("SELECT CID FILTERING") indicating the start of the CID transmission. It should be recognized that the signal SELECT CID FILTERING is not necessarily one signal but may be a composite of a plurality of signals which combine to accomplish the aforesaid filtering of the incoming voice signal. The means for generating SELECT CID FILTERING or its equivalent is conventionally available at switching facilities 1 implementing the CID/CW feature or can be created thereat from conventional circuits by one of ordinary skill in the pertinent art.

Figure 2:
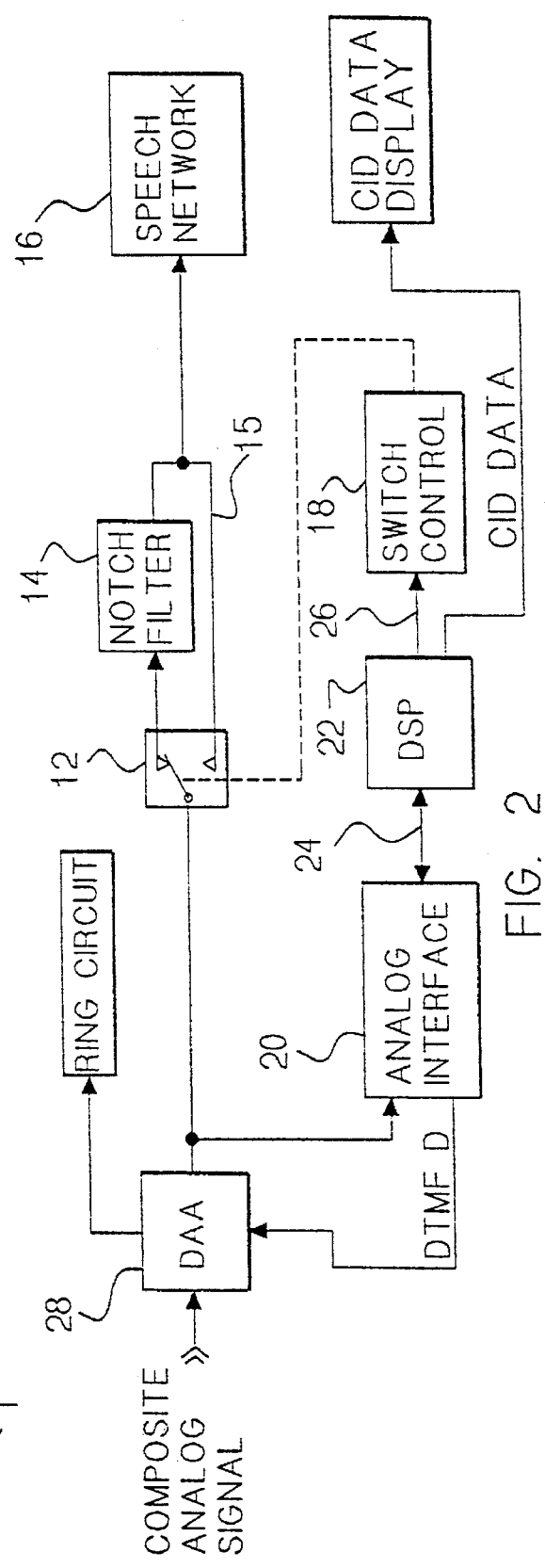
FIG. 2 is a functional block diagram of the first embodiment illustrating a user's telephone instrument portion of the embodiment directed to a CID/CW application.

Referring to FIG. 2, the composite analog signal sent by the switching facility is received by the user's telephone equipment and communicated to a switch 12 which provides two alternative paths for the incoming signal: a path through a notch filter circuit 14 and a path 15 that bypasses the notch filter circuit. Depending on the setting of the switch the incoming signal is either processed, preferably by a pair of serially connected notch filters 14, or alternately unprocessed before it is communicated to a conventional speech network 16. If CID data is not present, then the switch is configured to bypass the notch filter circuit. The switch is preferably a conventional semiconductor analog signal switch integrated with a switch control circuit 18.

Conventionally the user's telephone instrument is informed by the telephone company's switching facility that CID data is going to be sent by means of a special alerting tone comprising a 2130 Hz tone and a 2750 Hz tone sent simultaneously for approximately 50 milliseconds. This tone is used to alert the user's instrument that the CID data is forthcoming. When the user's instrument recognizes the alerting tone, it responds by sending back to the switching facility an acknowledgment tone conventionally called a "DTMF D" tone for 50 to 55 milliseconds. The alerting and acknowledgment tones are both well known in the art of telephone communication.

Referring to FIGS. 1 and 2, according to this invention, the two tones comprising the alerting tone and their simultaneous duration are recognized by means of an analog interface 20 and a digital signal processor ("DSP") 22. The composite analog signal received by the user's instrument is communicated to the analog interface which preferably is an integrated circuit such as the TLC32046 which is a wideband analog interface circuit manufactured by Texas Instruments and conventional support circuits. By well known techniques, the analog interface quantizes the composite analog signal and presents the quantized data to a serial port 24. Communicating with this port is the digital signal processor which is preferably a TMS320C40 processor, and conventional support circuits, manufactured by Texas Instruments, and which is programmable by well known techniques to perform fourier analysis on quantized signals such as the alerting tone and the CID signals which follow the alerting tone. Using the TLC32046 and the TMS320C40 in combination to analyze analog signals in real time is well known. In response to the alerting tone, the DSP communicates a signal 26 to the switch control 18 which causes the notch filter 14 path to be selected for the incoming composite analog signal. After the CID data has been sent the DSP removes the signal 26 which causes the bypass path 15 to be selected by the switch 12. Also in response to the alerting tone, the DSP causes the analog interface, by well known techniques, to send the DTMF D acknowledgement signal back to the switching facility.

In operation, the notch filter circuit 14 effectively removes from the incoming composite signal those frequencies used by the switching facility to construct the CID data signals. For example, if the switching facility combined FSK encoded CID data in the composite analog signal, those frequencies, plus and minus a tolerance, that were used in the FSK technique are effectively removed from the composite signal before it reaches the speech network. In a PSK method, a single notch filter removes the carrier frequency. In this way, the user is not subjected to the audible frequencies used to transmit the CID data, but the overall fidelity of the voice signal is only insignificantly reduced.

Figure 3:
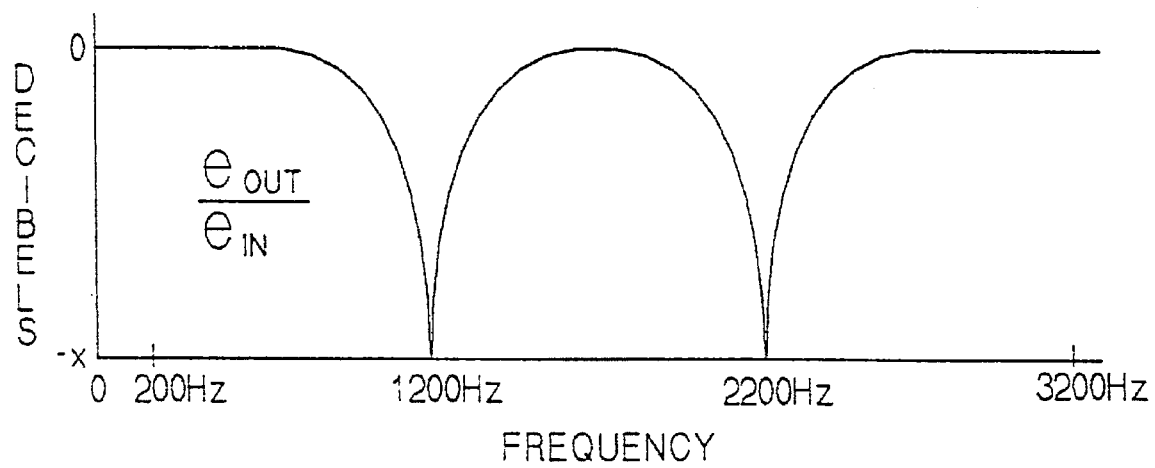
FIG. 3 is a frequency response graph generally illustrating nominal frequency characteristics of a notch filter according to this invention.

Referring again to FIGS. 1 and 2, the composite analog signal communicated between the telephone company's switching facility and a user's telephone instrument is conditioned by a DAA (Data Access Arrangement) circuit 28 required by the Federal Communications Commission (FCC) and permits bilateral communication between the switching facility and the user's telephone equipment over the same channel. These DAA circuits are conventional and can be made from a DS2249PH manufactured by Dallas Semiconductor. These DAA circuits provide a bidirectional signal interface and necessary circuit isolation. At the switching facility end conventional network interface circuits 30 are used to accomplish the same end, bilateral communications over the same channel. Referring to FIG. 3, illustrated is the general form of frequency response curves for the notch filters adapted to be centered at 1200 Hz and 2200 Hz respectively. These are the frequencies arbitrarily selected for "mark" and "space" frequencies for an FSK method of transferring the CID data. They are certainly not the only pair of frequencies that could have been selected without departing from the spirit and scope of this invention. The requirement for CID/CW as set by the telephone regulating authorities is to maintain the overall present telephone speech fidelity from 200 to 3200 Hz. The present invention only degrades the speech path during the 3 to 4 second interval of the actual CID data transmission.

Figure 4:
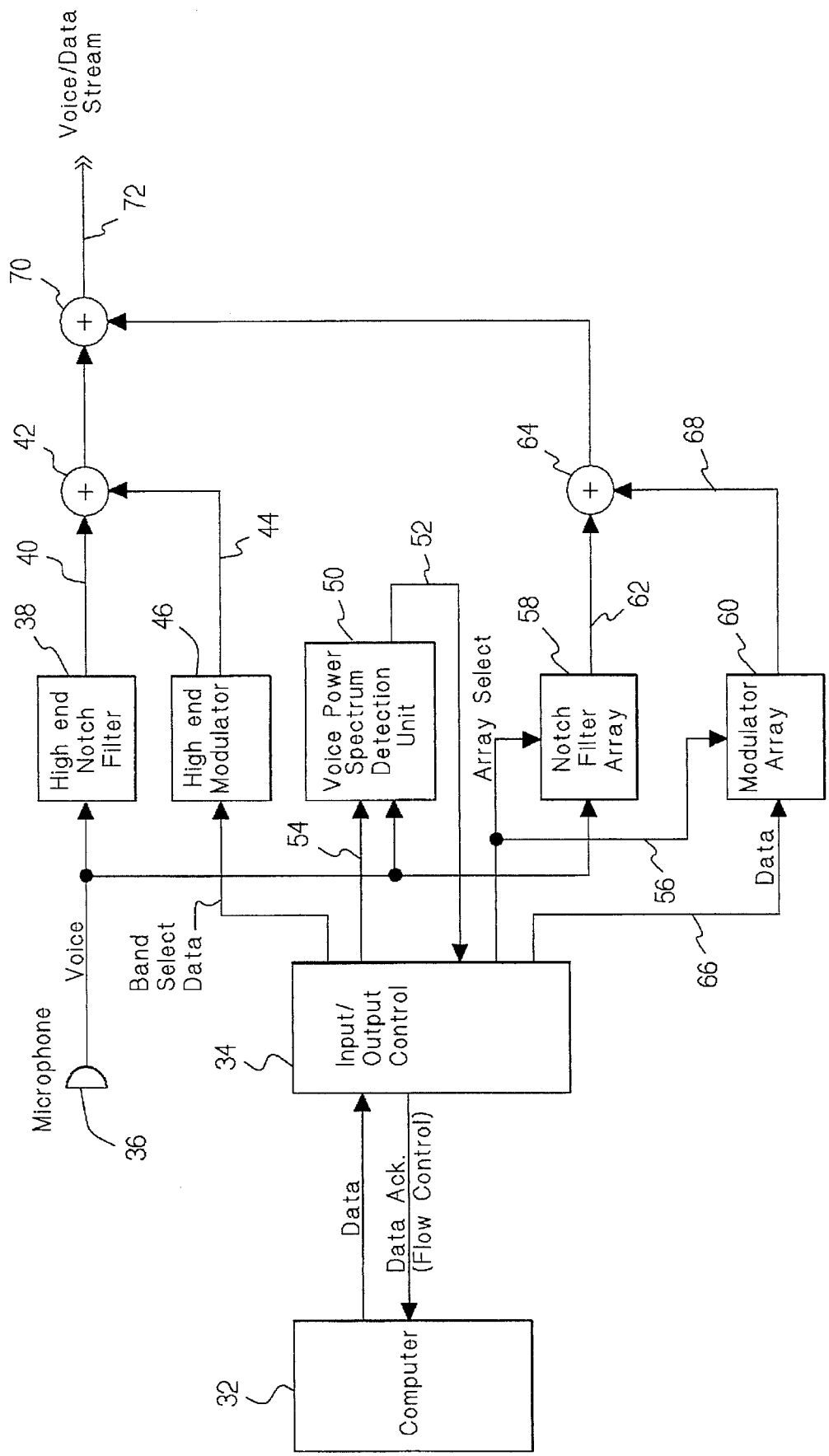
FIG. 4 is a functional block diagram of a data transmission portion of a second embodiment of this invention.

Referring to FIG. 4, a computer 32 is in data communication with an input/output controller 34. The computer can be any source of data to be transmitted across the analog channel and need not necessarily be a computer. The computer sends data to the input/output controller in predetermined units of data, for example in bytes of data. For each unit, the input/output controller responds by sending a data acknowledgement signal back to the computer. In this way the flow of data is controlled by the input/output controller's data acknowledgement signal. The input/output controller is preferably a microcomputer with program memory and data memory or a digital signal processor also with program memory and data memory. The data received by the controller is buffered in its data memory.

Referring again to FIG. 4, an acoustic transducer, illustrated as a microphone 36, receives sound pressure waves and converts them to a signal indicated as a "Voice" signal. It should be understood that the source of the sound need not necessarily be a voice. The signal from the microphone is communicated to a high end notch filter 38, i.e. a band elimination filter, that eliminates a small band, relative to the size of the voiceband, of frequencies at the uppermost end of the voiceband spectrum and produces a filtered signal 40 which is communicated to a first summing node 42. A second input to the summing node is a signal 44 from a high end modulator 46. The high end modulator receives band select data 48 from the input/output controller and modulates it with a frequency from a frequency source (not shown) according to a selected modulation scheme such as FSK, PSK or any other conventional modulation scheme for sending digital data across an analog channel. The significance of the band select data will be discussed below.

Referring again to FIG. 4, the voice signal from the microphone is also communicated to a voice power spectrum detection unit 50 which periodically analyzes the voice power across the spectrum of the voiceband to determine bands of frequencies within the spectrum in which the voice power is below a preselected threshold, and which encompass one or more "data subchannels." A data subchannel is a unique frequency or set of frequencies used to encode data for transmission via an analog channel. For example, the two frequencies of FIG. 3 used for FSK encoding define a unique data subchannel. As another example, a frequency and surrounding band used for PSK encoding would also define a unique data subchannel. The detected frequency bands containing voice power below the threshold and containing one or more data subchannels can be called "holes" in the voiceband spectrum. Preferably there are a plurality of predetermined subchannels across the voiceband with known encoding schemes so that for any given subchannel, both the transmitter and the receiver will be aware of how the data being sent via the subchannel is encoded.

Referring again to FIG. 4, the detection unit 50 can be, for example, a fast fourier transform circuit, or an algorithm performed by a digital signal processor (DSP). Preferably a complete voice analysis takes place once each 0.5 milliseconds and is accomplished in 0.5 microseconds. The output of the detection unit is a map 52 of holes across the voiceband. The operation of the detection unit is controlled by the input/output controller via control lines 54. As will be explained, these maps of holes in the analog signal spectrum determine the band select data 48 communicated to the high end modulator.

Referring again to FIG. 4, the input/output controller 34 communicates a set of array select signals 56 to a notch filter array 58 and a modulator array 60. The notch filter array is preferably implemented as a DSP algorithm and comprises an adaptable plurality of notch filters, a set (zero, one or more) of which is selected, via the array select signals. The set selected at any given time matches those holes in the voice spectrum that have been detected by the voice power spectrum detection unit 50. In other words, each time the detection unit makes an analysis of the then incoming voice signal and finds holes in the voiceband spectrum, the input/output controller configures its array select signals to select notch filters centered in the detected holes. This results in elimination of the voice signal in these holes at the output 62 of the notch filter array. This output is communicated to a second summing node 64.

Referring again to FIG. 4, the input/output controller also communicates data 66 to the modulator array 60. The data 66 is the digital data to be communicated via the analog channel. The modulator array comprises a plurality of modulators selectable by the array select signals 56. Each modulator corresponds to a unique data subchannel and modulates data from the input/output controller according to the subchannels known modulation scheme, e.g. FSK, PSK, etc. The modulators are selected by the array select signals and the set of modulators selected matches the set of data subchannels found in the then current holes detected in the voiceband. The data from the input/output controller is orderly, for example in sequence, modulated by the selected modulators and communicated to the summing node 64 where it is summed with the output of the notch filter array 58. The outputs of the summing nodes 42 and 64 are also summed at node 70 and communicated to telephone line 72 as a voice/data stream.

Figure 5:
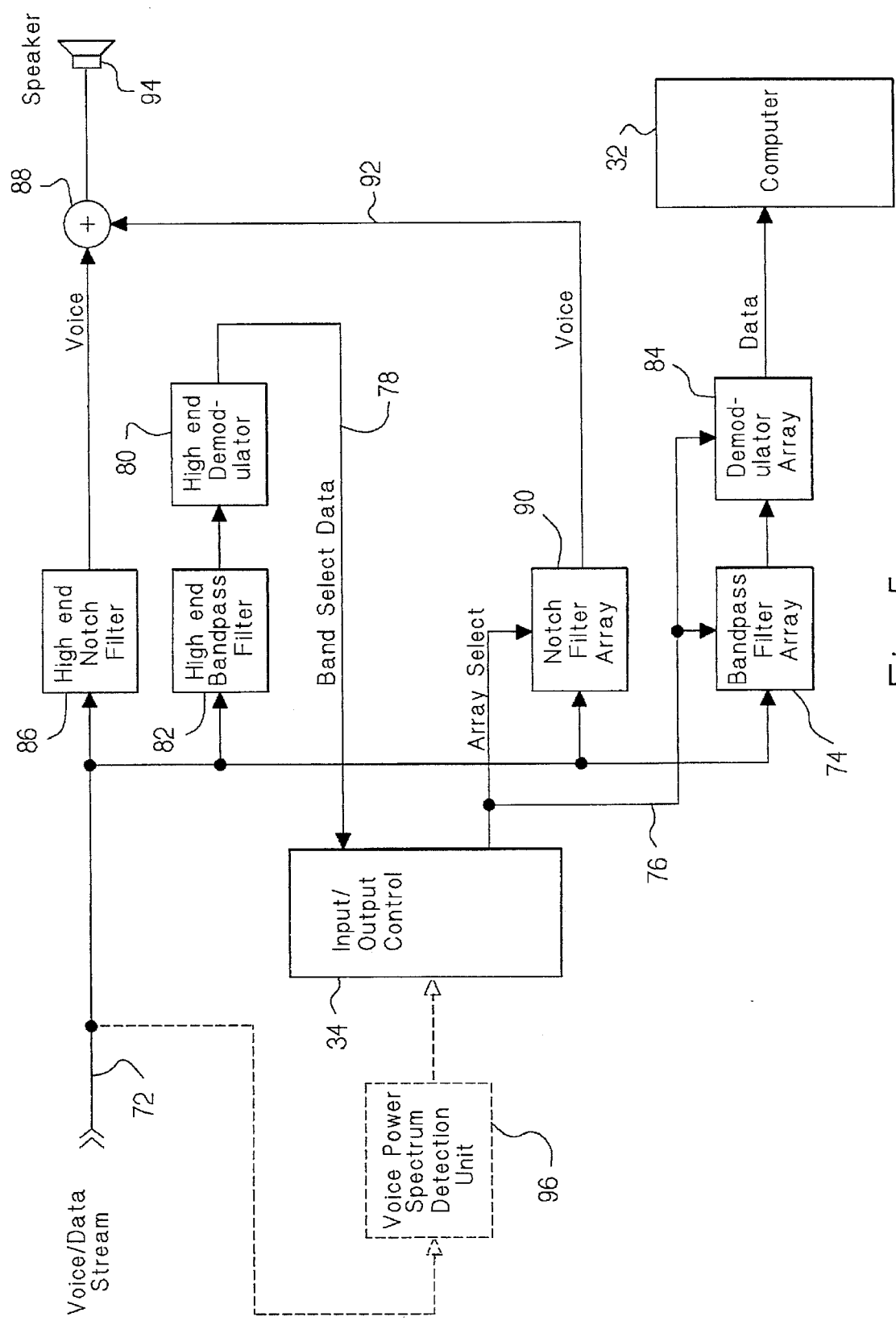
FIG. 5 is a functional block diagram of a data receiving portion of the second embodiment of this invention.

Referring FIGS. 4 and 5, a receiving portion of this invention ("receiver") is preferably an integrated member of a transmitting portion ("transmitter") of this invention so that when two devices according to the preferred embodiment of this invention are communicating across an analog channel, two-way analog and digital data communications can occur simultaneously. However, the transmitter and the receiver can be at opposite ends of the analog channel for one way communication if so desired. In the preferred embodiment, however, the computer 32 receives data from the analog channel 72 via a bandpass filter array 74 which receives the voice/data stream as an input argument. The filter array also receives a control input comprising a plurality of array select signals 76 from the input/output controller 34. The array select signals are configured according to band select data 78 received by the controller from a high end demodulator 80. The high end demodulator receives as an input the output of a high end bandpass filter 82 which is in communication with the analog channel 72. The band select data is that which was sent across the channel by a transmitter according to this invention. As explained above, the band select data comprises information concerning holes in the voiceband left by the voice signal being sent to the receiver, information derived from the periodic analysis of the voice signal by the detection unit 50. By specifying the holes, the band select data also specifies the currently active data subchannels. From this information, the input/output controller can select a set of bandpass filters from the bandpass filter array which correspond to the active data subchannels, and thereby allow only those frequencies of the active subchannels to pass to a demodulator array 84 which also receives the array select signals. It is the band select data sent via the high end data subchannel that synchronizes the set of modulators used by the transmitter and the set of bandpass filters and demodulators used by the receiver at opposite ends of the channel. Preferably, the band select data is a sequence of information defining at least the then current holes in the voiceband, and an input/output controller receiving the band select data considers each hole defined by the band select data to be opened until that hole is no longer designated in a subsequent burst of band select data received by it. Preferably a burst of band select data is sent each time an analysis of the voice signal is completed, for example every 0.5 milliseconds.

Referring again to FIG. 5, the voice/data stream of the analog channel 72 is communicated to the input of a high end notch filter 86 which basically eliminates the band select data from the stream. The output of the high end filter is communicated to a summing node 88. The voice/data stream is also communicated to a notch filter array 90 and processed by a set of selected notch filters, selected according to the array select signals 76. The selected set of notch filters basically eliminates the modulated data from the stream, and the outputs 92 of the set of selected notch filters are communicated to the summing node 88. The output of this summing node is communicated to a speaker 94 which transduces the summed signals to sound pressure waves.

Referring again to FIG. 5, a second voice power detection unit 96 is shown in phantom as monitoring the voice/data stream and providing an output to the input/output controller 34. This provides the controller, in its receiving function, with an optional capability of analyzing which subchannels of incoming data are currently active without relying entirely on the band select data sent by the transmitter. This can be used to verify or supplant the band select data, especially in situations where the analog channel is very noisy. The second detection unit can be a separate unit, or the two units can be one unit time shared by the controller.

Preferably many or all the functions indicated in FIGS. 4 and 5 are implemented by a preprogrammed DSP or other microcomputer, except the source and destination of the digital data illustrated as computer 32, and during pauses in the voice signal, as when a party momentarily stops talking, the entire voiceband is detected as a hole and is used to transmit data. Preferably the band select data is periodically sent in packets at a high end frequency such as 3500 Hz. In this way, data is continually being sent from transmitter to receiver indicating current holes openings and the width of the open holes for sending data.

While the foregoing discussion of the first embodiment centered around the application of this invention to sending CID data simultaneously with a voice signal, this invention is equally useful for other telecommunication applications. As shown in the second embodiment, it is useful for sending digital data via analog channels in general, including modem applications. Using this invention, two computers can be engaged in continuous two-way communication of digital data, such as by modems, while their operators can be engaged in voice communication, both over the same telephone line.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. In an analog channel having a predetermined plurality of subchannels for transmitting digital signals, a system for simultaneously communicating an analog signal and a digital signal via the channel comprising:
   (a) means, at a transmitter, for periodically searching within the analog signal for a frequency band in which the power of the analog signal is below a predetermined threshold and which band encompasses a subchannel;
   (b) means for removing from the analog signal those frequency components comprising the encompassed subchannel resulting in a first interim signal;
   (c) means, at the transmitter, for producing a second interim signal comprising a combining of the first interim signal and the digital signal constructed of one or more predetermined frequency components comprising the encompassed subchannel;
   (d) means, at the transmitter, for transmitting the second interim signal;
   (e) means, at a receiver, for receiving the second interim signal; and
   (f) means, at the receiver, for removing from the second interim signal those frequency components used to construct the digital signal.

2. The system according to claim 1 further comprising means for defining to the receiver the encompassed subchannel.

3. In an analog channel having a predetermined plurality of subchannels for transmitting digital signals, a system for simultaneously communicating an analog signal and a digital signal via the channel comprising:
   (a) means, at a transmitter, for periodically searching within the analog signal for frequency bands in which the power of the analog signal is below a predetermined threshold and which bands each encompass at least one subchannel;
   (b) means, at the transmitter, for removing from the analog signal those frequency components comprising the encompassed subchannels resulting in a first interim signal;
   (c) means, at the transmitter, for producing a second interim signal comprising a combining of the first interim signal and the digital signal constructed of frequency components comprising the encompassed subchannels;
   (d) means, at the transmitter, for transmitting the second interim signal;
   (e) means, at a receiver, for receiving the second interim signal;
   (f) means, at the receiver, for removing from the second interim signal those frequency components used to construct the digital signal; and
   (g) means, at the receiver, for extracting the digital signal from the second interim signal.

4. The system according to claim 3 further comprising means for defining for the receiver the encompassed subchannels for each period.

5. The system according to claim 4 wherein the means for defining comprises:
   (a) a predetermined control subchannel within the channel over which the transmitter communicates a signal each period defining the subchannels encompassed during said each period, and
   (b) means, at the receiver, for receiving said signal.

6. The system according to claim 4 wherein the means for defining encompassed subchannels comprises:
   (a) a predetermined control subchannel;
   (b) means, at the transmitter, for continuously removing from the analog signal those frequency components comprising the control subchannel resulting in a third interim signal;
   (c) means, at the transmitter, for producing for each period a digital control signal comprising information defining the encompassed subchannels of said each period, the control signals being transmittable via the control subchannel;
   (d) means, at the transmitter, for combining the third interim signal and digital control signals with the second interim signal before transmission of the second interim signal; and
   (e) means, at the receiver, for extracting digital control signals from the second interim signal.

7. The system according to claim 6 further comprising means for modulating the control signal for transmission via the control subchannel.

8. The system according to claim 5 wherein the control subchannel is at the high end of the analog channel.

9. The system according to claim 3 wherein the means for periodically searching comprises:
   (a) means for periodically detecting the power spectrum of the analog signal; and
   (b) means for searching the spectrum in each period for the frequency bands.

10. The system according to claim 3 wherein the means, at the transmitter, for removing from the analog signal those frequency components comprising the encompassed subchannels comprises:
    (a) an array of individually selectable notch filters, each filter uniquely corresponding to a subchannel, when selected each filter eliminating from the analog signal the frequency components within the subchannel to which it corresponds; and
    (b) means for selecting for each period the filters in the array according to the subchannels encompassed for said each period.

11. The system according to claim 4 wherein the means, at the transmitter, for removing from the analog signal those frequency components comprising the encompassed subchannels comprises:
    (a) an array of individually selectable notch filters, each filter uniquely corresponding to a subchannel excluding the control subchannel, when selected each filter eliminating from the analog signal the frequency components within the subchannel to which it corresponds; and
    (b) means for selecting for each period the filters in the array according to the subchannels encompassed for said each period.

12. The system according to claim 3 wherein the means, at the transmitter, for producing the second interim signal comprises:
    (a) an array of individually selectable modulators, each modulator uniquely corresponding to a subchannel, when selected each modulator modulating inputted digital data according to the subchannel to which it corresponds;
    (b) means for inputting digital data to the modulator array;
    (c) means for selecting within each period, in a predetermined order, the modulators in the array according to the subchannels encompassed in said each period; and (d) for each period, means for combining the outputs of all the modulators selected with the first interim signal to produce the second interim signal.

13. The system according to claim 4 wherein the means, at the transmitter, for producing the second interim signal comprises:

(a) an array of individually selectable modulators, each modulator uniquely corresponding to a subchannel except the control subchannel, when selected each modulator modulating inputted digital data according to the subchannel to which it corresponds;

(b) means for inputting digital data to the modulator array;

(c) means for selecting within each period, in a predetermined order, the modulators in the array according to the subchannels encompassed in said each period; and (d) for each period, means for combining the outputs of all the modulators selected with the first interim signal to produce the second interim signal.

14. The system according to claim 6 further comprising:

(a) means, at the receiver, for continuously removing from the second interim signal those frequency components comprising the control subchannel; and (b) detection means, at the receiver, for extracting from the second interim signal the control signal.

15. The system according to claim 11 wherein the means, at the receiver, for removing from the second interim signal those frequency components used to construct the digital signal comprises:

(a) an array of individually selectable notch filters, each filter uniquely corresponding to a subchannel, when selected each filter eliminating from the second interim signal the frequency components within the subchannel to which it corresponds; and (b) means for selecting for each period the filters in the array according to the subchannels encompassed for said each period.

16. The system according to claim 13 wherein the means, at the receiver, for extracting the digital signal from the second interim signal comprises:

(a) an array of individually selectable detection means uniquely corresponding to the transmitter modulators, when selected each detection means for extracting from the second interim signal the output of its corresponding modulator;

(b) means for selecting within each period, in the predetermined order, the detection means according to the subchannels encompassed in said each period; and (c) for each period, means for combining the outputs of all the selected detection means into a digital data stream.

17. The system according to claim 13 wherein the means, at the receiver, for extracting the digital signal from the second interim signal comprises:

(a) an array of individually selectable bandpass filters, each filter uniquely corresponding to a subchannel, when selected each filter passing only those frequencies comprising the subchannel to which it corresponds;

(b) an array of individually selectable demodulators, each demodulator uniquely corresponding to a bandpass filter within the array of bandpass filters, when selected each demodulator detecting the output of its corresponding bandpass filter;

(c) means for selecting within each period, in the predetermined order, the bandpass filters in the array and their corresponding demodulators according to the subchannels encompassed in said each period; and (d) for each period, means for combining the outputs of all the selected demodulators into a digital data stream.

18. The system according to claim 3 further comprising power analysis means, at the receiver, for determining the encompassed subchannels.

19. In an analog channel having a predetermined plurality of subchannels for transmitting digital signals, a method for simultaneously communicating an analog signal and a digital signal via the channel comprising the steps:

(a) at a transmitter, periodically searching within the analog signal for frequency bands in which the power of the analog signal is below a predetermined threshold and which bands each encompass at least one subchannel;

(b) at the transmitter, removing from the analog signal those frequency components comprising the encompassed subchannels resulting in a first interim signal;

(c) from the transmitter, transmitting a second interim signal comprising at least a combining of the first interim signal and the digital signal constructed of frequency components comprising the encompassed subchannels;

(d) at a receiver, removing from the second interim signal those frequency components used to construct the digital signal; and (e) at the receiver, extracting the digital signal from the second interim signal.

20. The method according to claim 19 comprising the further step of communicating, for each period, from the transmitter to the receiver a control signal at least defining the encompassed subchannels for said each period.

* * * * *